(12) United States Patent
Römer et al.

(10) Patent No.: US 6,577,667 B1
(45) Date of Patent: Jun. 10, 2003

(54) SKULL POT FOR MELTING OR REFINING INORGANIC SUBSTANCES

(75) Inventors: Hildegard Römer, Karben (DE); Wolfgang Schmidbauer, Mainz (DE); Werner Kiefer, Mainz (DE); Guido Räke, Bingen (DE); Frank-Thomas Lentes, Bingen (DE)

(73) Assignee: Schott Glas, Mainz (DE)

( * ) Notice: Subject to any disclaimer, the term of this patent is extended or adjusted under 35 U.S.C. 154(b) by 0 days.

(21) Appl. No.: 10/049,966

(22) PCT Filed: Aug. 16, 2000

(86) PCT No.: PCT/EP00/07988

§ 371 (c)(1), (2), (4) Date: Jun. 12, 2002

(87) PCT Pub. No.: WO01/14265

PCT Pub. Date: Mar. 1, 2001

(30) Foreign Application Priority Data

Aug. 21, 1999 (DE) .......................... 199 39 772

(51) Int. Cl.[7] .................................. H05B 6/22
(52) U.S. Cl. .................. 373/156; 373/138; 373/146
(58) Field of Search .................. 373/138, 139, 373/151, 152, 155, 156, 158, 7, 59, 146; 266/241, 236; 75/10.14

(56) References Cited

U.S. PATENT DOCUMENTS

| | | | |
|---|---|---|---|
| 3,461,215 A | | 8/1969 | Reboux |
| 4,471,488 A | * | 9/1984 | Reboux ........................ 373/153 |
| 4,780,121 A | | 10/1988 | Matesa |
| 4,923,508 A | * | 5/1990 | Diehm et al. ................. 75/10.14 |
| 6,058,741 A | | 5/2000 | Sobolev et al. |

FOREIGN PATENT DOCUMENTS

| | | |
|---|---|---|
| DE | 2033074 | 7/1970 |
| DE | 3316546 | 4/1984 |
| DE | 3316547 | 11/1984 |
| EP | 0079266 | 5/1983 |
| EP | 0119877 | 2/1988 |
| FR | 2456926 | 12/1980 |
| FR | 2768257 | 3/1999 |
| RU | 1337351 | 9/1987 |
| RU | 2065413 | 4/1992 |
| RU | 2132097 | 5/1998 |

OTHER PUBLICATIONS

Petrov, Yu.B. et al, "Continuous Casting Glass Melting in a Cold Crucible Induction Furnace", XV International Congress on Glass 1989, vol. 3a, 1989, pp. 72–77.

V.V. Nezhentsev et al, "Use of Induction Furnaces with a Cold Crucible for Melting Hard Glasses", Glass and Ceramics, vol. 43, 1986, Sep.–Oct., Nos. 9–10, pp. 391–396.

* cited by examiner

*Primary Examiner*—Tu Ba Hoang
(74) *Attorney, Agent, or Firm*—Baker & Daniels

(57) ABSTRACT

According to the invention, the skull pot is provided with the following characteristics: a pot wall (1), a bottom (3) and an induction coil (9) which surrounds the pot wall (1) and by means of which high-frequency energy can be coupled into the contents of the pot. The pot wall (1) is made of a ring of metal pipes (1.1) which can be connected to a cooling medium. Slits are embodied between adjacent metal pipes (1.1). The metal pipes (1.1) are bent at a right angle at the upper ends thereof in such a way that said pipes extend towards the outside, when the pot wall (1) is viewed from above, and form a collar (2). The collar (2) is surrounded by an additional wall (upper wall 4). The upper edge of said wall is situated on a higher level than the collar (2) in such a way that the melt covers the collar (2) during operation.

20 Claims, 7 Drawing Sheets

SKULL POT FOR MELTING OR REFINING INORGANIC SUBSTANCES

The invention relates to a so-called skull crucible for melting or refining glasses or glass ceramics.

Troughs made of refractory material are strongly attacked by glasses with high melting points above 1650° C., so that the dwell times become uneconomical and the produced glasses are full of stones, knots and streaks from the trough material.

At temperatures above 1650° C., the use of an additional electric heating is strongly impaired because the corrosion of the electrodes such as Mo-electrodes increases strongly and the glasses are strongly colored by the impurities.

Aggressive glasses as are required for a number of optical applications for example strongly attack the ceramic refractory materials during the melting, and especially meltdown, even at lower temperatures. The strong attack on the trough allows neither an economic melting concerning the service life of the troughs, nor a precise adherence to the composition and, in connection with this, the required properties. That is why many of these glasses are molten in platinum troughs. A number of the aggressive glasses cannot be molten even in platinum crucibles, because they attack platinum and the dissolved platinum oxide colors the glass or the platinum oxide is reduced to platinum metal during the further processes and causes disturbances as platinum particles.

In high-purity glasses as are used in fiber optics for example, even very few ppb of coloring oxides which are introduced by the melting process can be disturbing.

The heating of glass by means of high frequency offers the possibility to couple the energy directly into the glass. Impurities by electrode corrosion can thus be prevented. The U.S. Pat. No. 4,780,121 describes a high-frequency heated ceramic refining crucible in which soda-lime-silica glass is refined at temperatures of between 1150° C. and 1450° C. The disadvantage of this method is that the refractory material is still very strongly attacked by the glasses at temperatures over 1700° C.

As a result of the direct energy induction into the glass, the glasses can also be heated to temperatures above 1650° C. When using ceramic crucible or trough materials, the temperature on the inner wall of the crucible should not exceed 1650° C. In order to maintain this temperature it is necessary that the temperature gradient in the crucible wall must become increasingly steeper with rising temperatures, i.e. the crucible wall must become increasingly thinner and the cooling of the outer wall must become increasingly more intense. The cooling of the outer wall by natural convection as described in the U.S. Pat. No. 4,780,121 is limited within narrow margins since arc-overs occur between the crucible wall and the coil by the heated air. Higher melting temperatures can be achieved when the ceramic crucible is cooled by water-cooled copper pipes.

In a number of patent specifications (U.S. Pat. No. 3,461,215, DE 2 033 074, EP 0 119 877 B1, DE 3 316 546 C1) skull crucibles are described in which the ceramic inner crucible is omitted entirely. Melting temperatures of up to 3000° C. are reached. In literature, continuously operating skull crucibles for melting radioactive materials are described. By using the skull crucible, it is possible to avoid obtaining radioactively contaminated trough material. No requirements are placed on the molten glass concerning the bubble quality.

DE 33 16 547 C2 describes a cold crucible for the melting of non-metallic organic compounds. A superstructure is placed on the upper crucible edge which consists of oxide ceramics. This superstructure is of cylindrical shape. It is used for reducing heat losses.

The disadvantage of all skull crucible systems as described in literature and the patents is that the water-cooled components reach into the gas space above the melt surface. A number of substantial problems are linked to this:

1. The melt surface is cooled by heat dissipation and the water-cooled skull crucible walls. This leads to a significant temperature gradient from the center to the surface of the melt. This is disadvantageous for the application as a refining unit, because the bubbles cannot rise at all or only rise inadequately through the cold surface layer or strong foam formation occurs.
2. When using an additional burner heating, the sulfur-containing burner exhaust gases condensate on the cooled skull fingers and lead to corrosion of the copper as a result of the formation of sulfuric acid. This drastically reduces the service life of the skull crucible.
3. In the case of aggressive glasses, corrosion of the water-cooled copper components in the upper furnace chamber can occur. As a result of direct flaking of the corroded cooling finger surface or by conveyance via the gas phase, the metallic impurities reach the glass melt and lead to discolorations of the melt.

The object of the present invention is to provide a high-frequency heated skull crucible without a ceramic inner crucible for heating glass melts to temperatures of up to 3000° C., preferably up to 2600° C., and the glass surface to temperatures of up to 2600° C., preferably up to 2400° C., and in which the metallic cooling fingers are protected against corrosion by condensed combustion gases or evaporation products.

This object is achieved by the features of claim 1.

The following is achieved in detail by the invention: The cooling fingers are completely covered by the glass melt on the side facing the glass melt. They are thus protected against the exhaust gases or evaporation products from the hot glass surface.

This is achieved in such a way that the metallic cooling fingers converge in the upper crucible zone, but underneath the glass surface, from the perpendicular into the horizontal. This convergence can be made gradually or the cooling pipes are bent by 90°. The bending of the cooling pipes into the horizontal leads to a cooled collar a short distance underneath the melt surface. The temperature of the glass melt decreases outwardly in the zone of the collar. The glass melt can be cooled off in the edge zone of the collar to such an extent that a ring made of ceramic refractory material can be placed on the edge of the collar. The temperature in the edge zone can be set in the edge zone via the collar diameter and the glass level, so that even at very high melt temperatures in the core zone the glass can be cooled off in the outer zone and can be held by the refractory edge.

Corrosion problems on the metallic cooling fingers are thus avoided. The service life of the metal pipes and thus of the crucible per se is increased by several times.

Furthermore, the glass surface is screened from the cooling fingers by the melt per se. The melt prevents that the upper furnace chamber is cooled in an undesirable way by the cooling fingers. Higher temperatures can thus be achieved in the upper furnace chamber in a controlled way, so that higher temperatures are also obtained in the surface layer of the melt. This is particularly advantageous during the refining. It is thus possible to either omit the addition of refining agents or the refining process can be performed in a shorter period.

The mushroom-like crucible shape in accordance with the invention is not only advantageous during the refining but already during the melt-down process. Because the surface assumes higher temperatures than in conventional crucibles, there is a more rapid melt-down of the glass batch. The throughput is thus increased as compared with known crucibles. A further advantage of the invention is that no corrosion products of the cooling finger can reach the glass melt.

The invention allows meeting all requirements for technical as well as optical glasses, which especially includes the demand for favorable transparency, whereby the glasses must be free from any bubbles.

During the refining with a mushroom-type crucible according to the invention, the glass is liberated from physically and chemically bound gases. The refining process is supported during conventional glass melting by refining agents such as $N_2SO_4$, $As_2O_3$, $Sb_2O_3$, or NaCl. Said refining agents decompose or evaporate at refining temperature and form bubbles into which the residual gases from the melt can diffuse. The refining bubbles must be sufficiently large in order to rise to the surface in the glass melt and burst there within economically viable times. The rising speed of the bubbles depends both on the bubble size and the viscosity of the glass. In the case of a temperature increase from 1600° C. to 2400° C., the rising speed increases approximately by a factor of 100, i.e. a bubble with a diameter of 0.1 mm rises at 2400° C. as fast as a bubble of 1 mm at 1600° C.

By increasing the refining temperature, the physical and chemical solubility is decreased in most gases and thus the high-temperature refining is additionally supported.

The high-temperature refining offers the possibility either to radically reduce the refining time or to omit the addition of refining agents for producing large refining bubbles. The precondition is, however, that the rising gas can reach the glass surface and the bubbles disposed at the surface will burst and no foam is formed.

A particularly decisive advantage is thus the extraordinarily high temperature which can be achieved with the invention.

The heating of the mushroom-type crucible in accordance with the invention is carried out substantially by irradiation with high-frequency energy in the crucible zone below the collar. The melt surface is considerably hotter in the upper furnace chamber due to thermal insulation than in the simple known cylindrical skull crucibles.

In the mushroom-type crucible in accordance with the invention, the melt surface can be additionally heated by a gas burner or radiation heating. The exhaust gases from the burner cannot condensate on cold components in this arrangement. Instead, they are led off from the crucible zone via an exhaust gas opening. The same applies to evaporation products from the hot glass surface. As a result, there are no longer any corrosion problems on the metallic cooling fingers and the mushroom-type crucibles have a virtually unlimited service life.

The increase of the temperature in the melt surface by improved insulation of the upper furnace chamber or by additional heating with gas burners or radiation heating also produces an improved coupling of the high frequency into this zone, because the hotter glass surface layers have a higher conductivity than cold ones. A self-amplifying effect is thus obtained.

Improved results could also be achieved for the refining due to the hot melt surface, because a hot glass surface is a precondition for an effective bubble emission from the melt. Although the glass surface shows a descending temperature gradient towards the edges, the bubbles which are produced in the vertical part of the crucible and rise perpendicularly meet a hot glass surface. A rapid rise of bubbles and thus rapid bursting of the bubbles is ensured.

The invention is now explained in closer detail by reference to the enclosed drawings, wherein.

Figure 1:
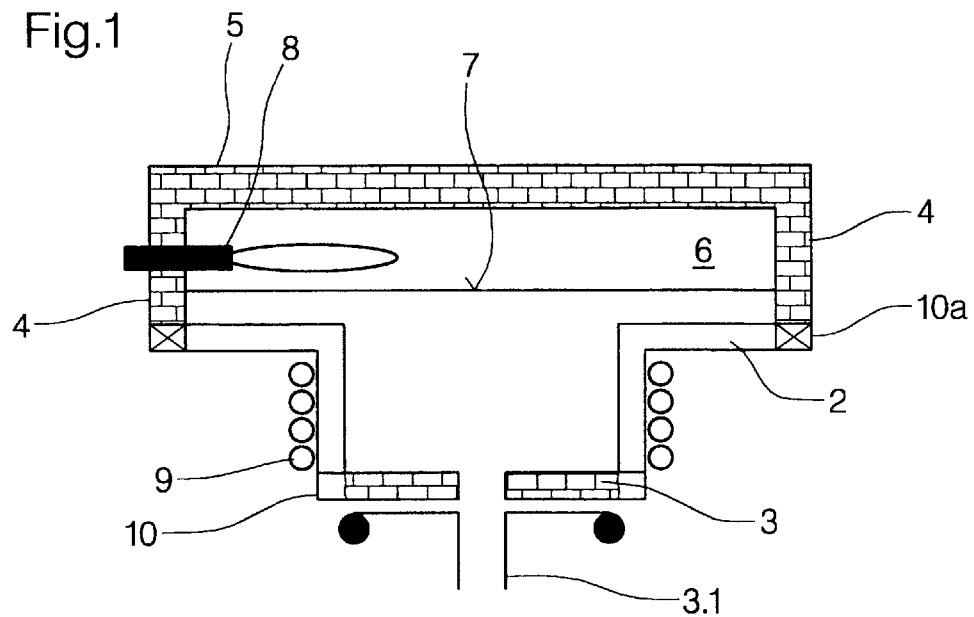
FIG. 1 shows a schematic view in an upright projection of the basic principle of a mushroom-type crucible.

The crucible shown in FIG. 1 is substantially shaped like a mushroom, as is shown. It comprises a cylindrical wall 1. It is formed by a ring of vertical metal pipes. The vertical metal pipes are bent at their upper ends by 90 degrees and form in their entirety a collar 2.

The bottom 3 of the crucible is made of refractory material which can be laid in bricks. The bottom can also be made of cooled metallic pipes or rings. This is particularly advantageous at very high melting temperatures. One can also see an outlet 3.1 for discharging the finished glass melt.

An upper wall 4 is placed on the outer edge of collar 2. It is designed as a cylindrical ring of a ceramic refractory material. A cover 5 also consists of refractory material. The upper furnace chamber 6 is enclosed by the upper wall 4, the cover 5 and the liquid level 7 of the melt.

The nozzle 8 of a burner projects into the upper furnace chamber 6.

An induction coil 9 is provided. It is used to couple high-frequency energy into the glass melt of the crucible.

In the lower zone of the crucible wall 1 there is an electric short-circuit ring 10. It encloses the bottom 3. It concerns a water-cooled ring with which the bottom 3 of the mushroom-type crucible is short-circuited. The short-circuit is necessary in order to prevent arc formation at high melting temperatures. In very large crucibles there is an additional electric short-circuit ring 10a above at the collar edge.

Although the horizontal pipe sections 2.1 which form the collar 2 are bent rectangularly as compared with the perpendicular pipes 1.1, this need not necessarily be so. It is also possible that the pipe sections 2.1 could extend under another angle, e.g. in such a way that they rise slightly from the inside to the outside.

Figure 2:
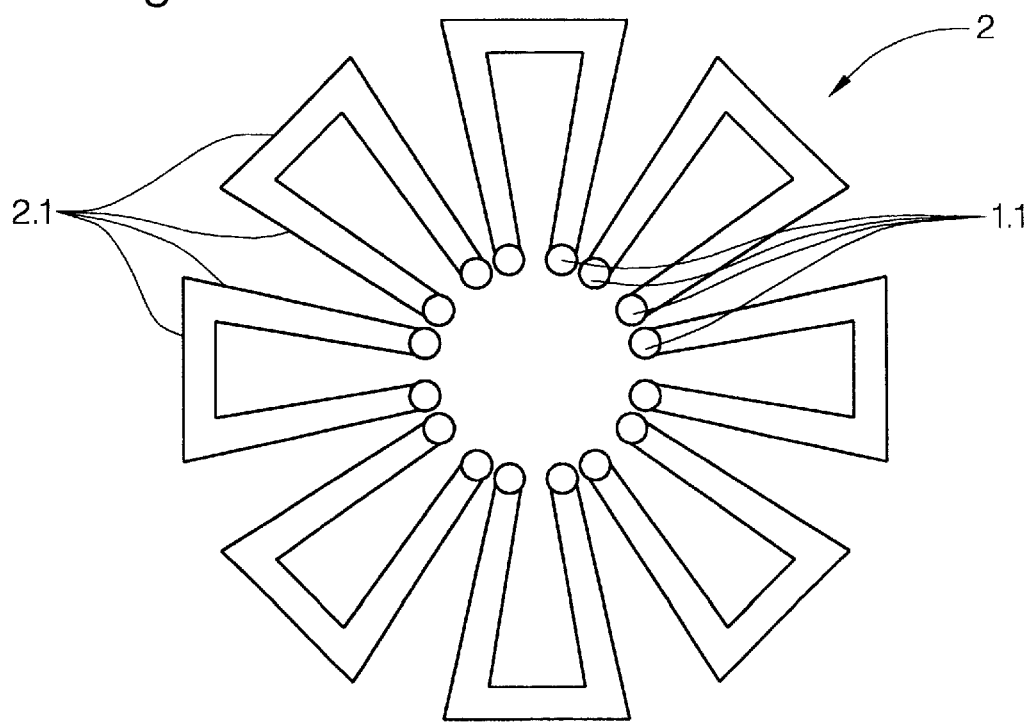
FIG. 2 shows a top view of the metal pipes from which the collar is formed.

FIG. 2 shows that the pipes 1.1 of the crucible wall 1 are arranged in a ring-like manner and approximately form a cylinder.

FIG. 2 further shows the configuration of the pipes 2.1 of the collar 2.

Figure 3:
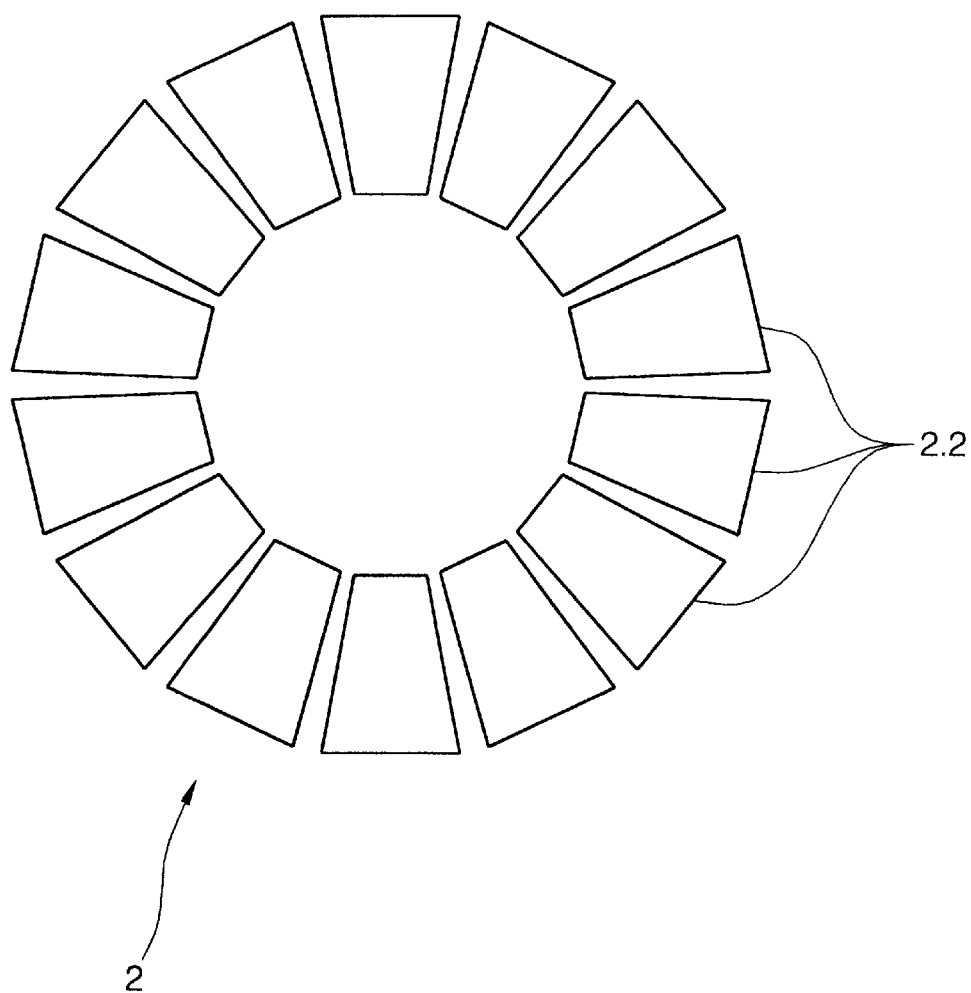
FIG. 3 shows a top view of a collar which is formed from plates.

FIG. 3 shows a top view of another arrangement of a collar 2. The collar consists in this case of a plurality of hollow plates 2.2. They are connected to the metal pipes 1.1 of the crucible wall 1. They can be flowed through by coolant alternatingly radially from the outside to the inside and from the inside to the outside.

Instead of the hollow plates 2.2 which are flowed through, it is also possible to provide the following construction: Plates are provided as shown in FIG. 3, but coolant does not flow directly through the plates. Instead, they enclose metal pipes which are flowed through.

Figure 4:
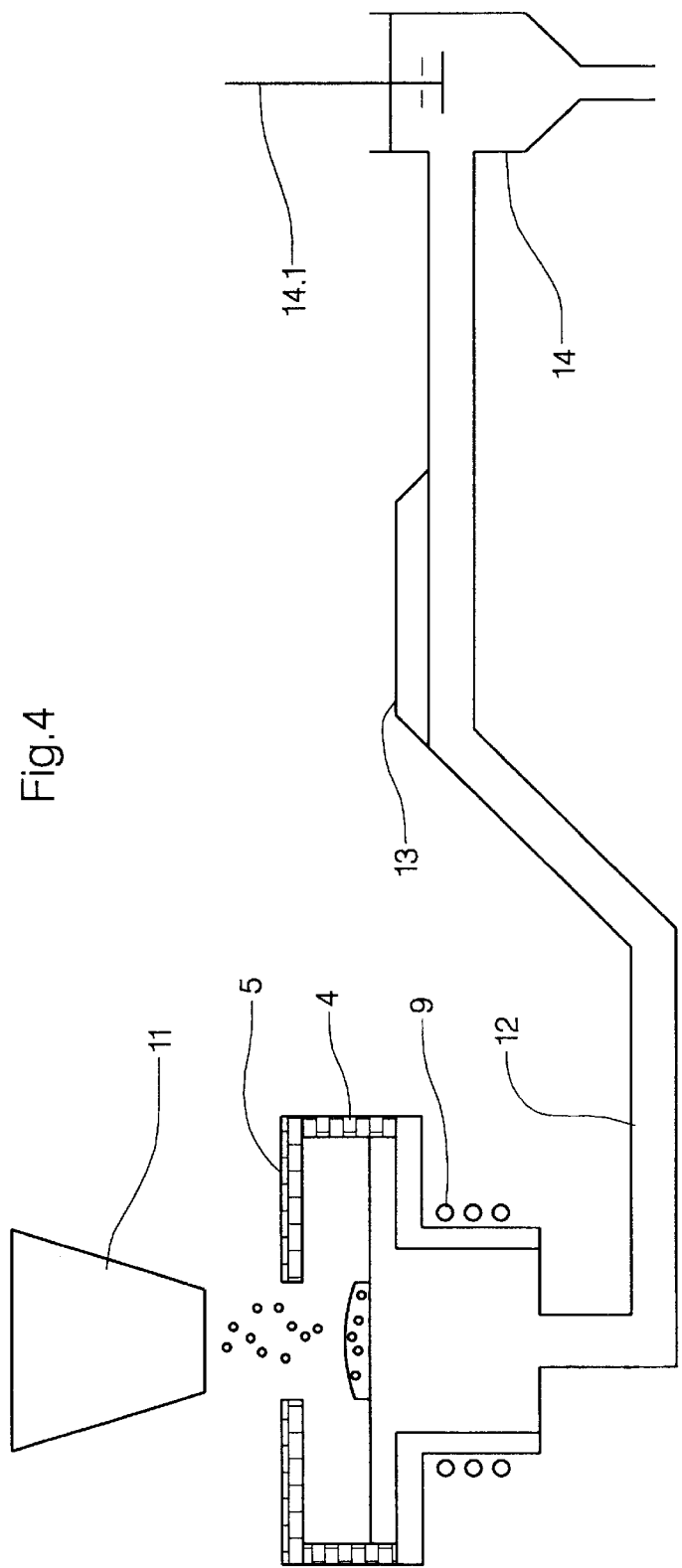
FIG. 4 shows in a schematic representation an installation for melting and refining glass in which the mushroom-type crucible is used for melting glass.

The installation according to FIG. 4 shows a filling funnel 11 with which a melting crucible is supplied with a glass batch or refuse glass. The melting crucible again comprises the most essential components of the mushroom-type crucible according to FIG. 1, i.e. a crucible wall 1, a collar 2, a bottom 3, an upper wall 4, a cover 5 as well as an induction coil 9.

After melting in the mushroom-type crucible, the melt reaches a refining chamber 13 through a conduit 12 and finally a shaping station (not shown) via a conditioning reservoir 14 with a stirrer 14.1.

Figure 5:
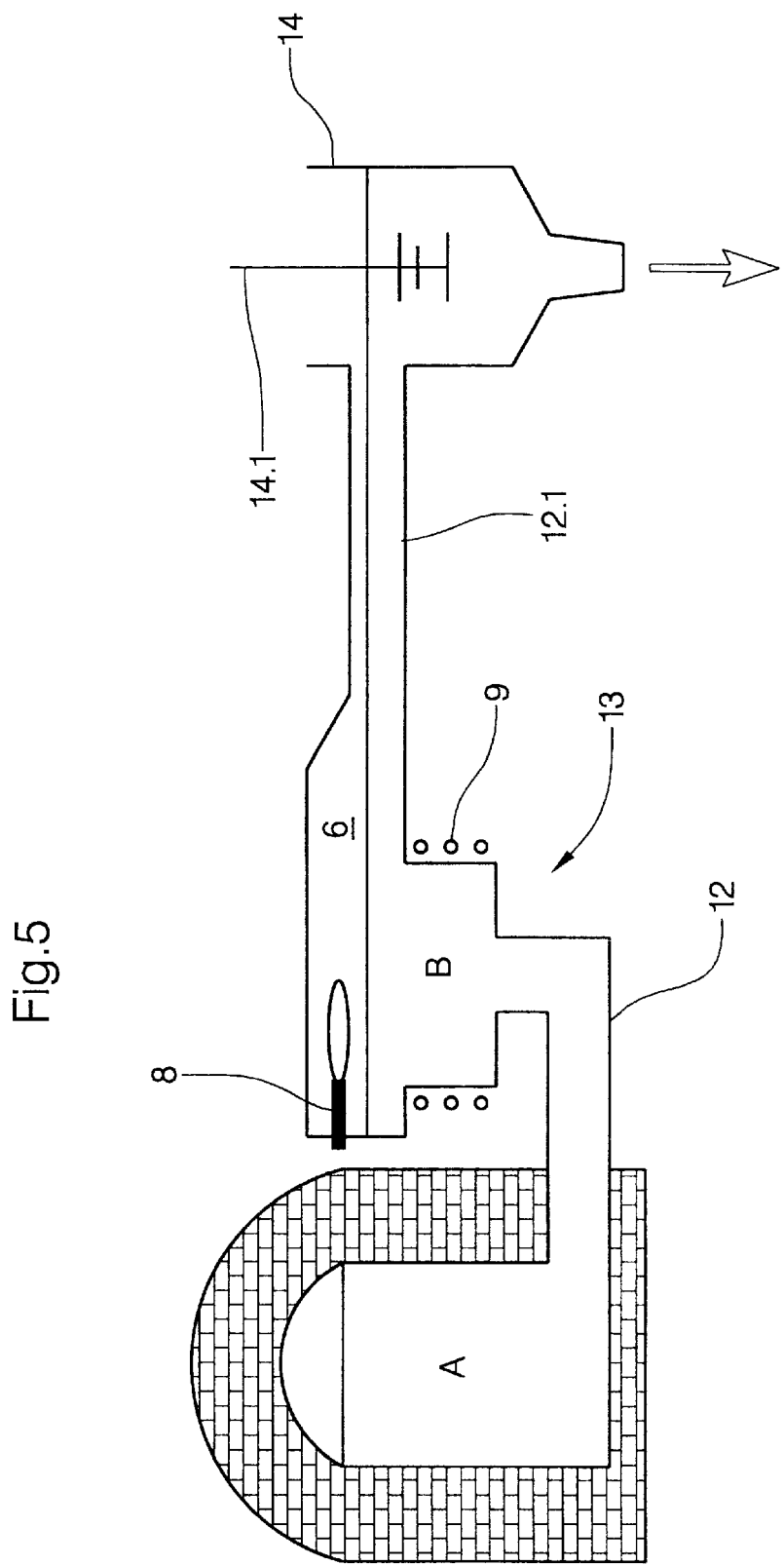
FIG. 5 shows in a schematic representation another installation for melting and refining glass in which the mushroom-type crucible is used for refining glass.

In the embodiment according to FIG. 5 the glass is molten in a conventional manner in a melting end which is made of bricks from a refractory material. Temperatures of up to 1700° C. are reached.

The melt arrives from below into a mushroom-type crucible 13 via a connecting conduit 12 where the refining takes place. The mushroom-type crucible is again enclosed by an induction coil 9. The arch above the melt level is further associated with a burner. In the mushroom-type crucible, the arch is additionally heated with the burner or a plurality of burners at melt temperatures of up to 1900° C. (core temperature of the melt) in order to ensure sufficient surface temperatures of more than 1700° C. for the refining. At very high melt temperatures of over 2000° C. it is necessary to actively cool the arch in order to avoid overheating. Cooling is performed by injecting air or other gases into the upper furnace chamber 6 or by cooling the arch with a liquid medium. The arch, like the crucible, is made from coolable metallic components which, however, are lined with refractory materials in order to prevent corrosion by exhaust gases.

The glass melt leaves the refining crucible 13 by emerging to the side in the zone of the collar. It reaches a cooling conduit 12.1 where it is cooled to temperatures of below 1700° C. A conditioning reservoir 14 with a stirrer 14.1 is connected to the cooling conduit 12.1.

Figure 6:
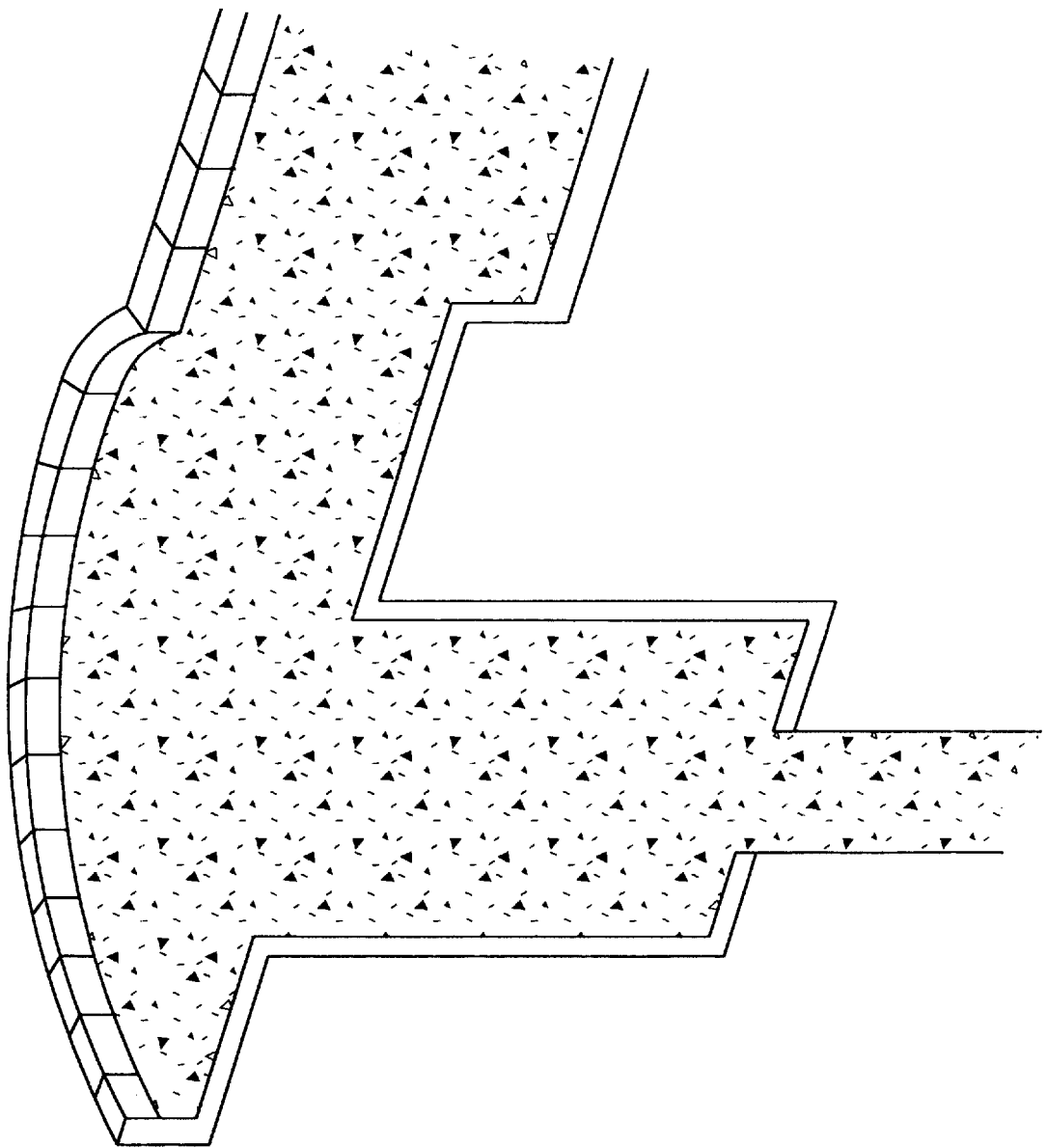
FIG. 6 shows a schematic view in an upright projection of the basic principle of a mushroom-type crucible with an outlet in the upper zone.

FIG. 6 shows a cross-section through a mushroom-type crucible with an outlet at the side at the top.

Figure 7:
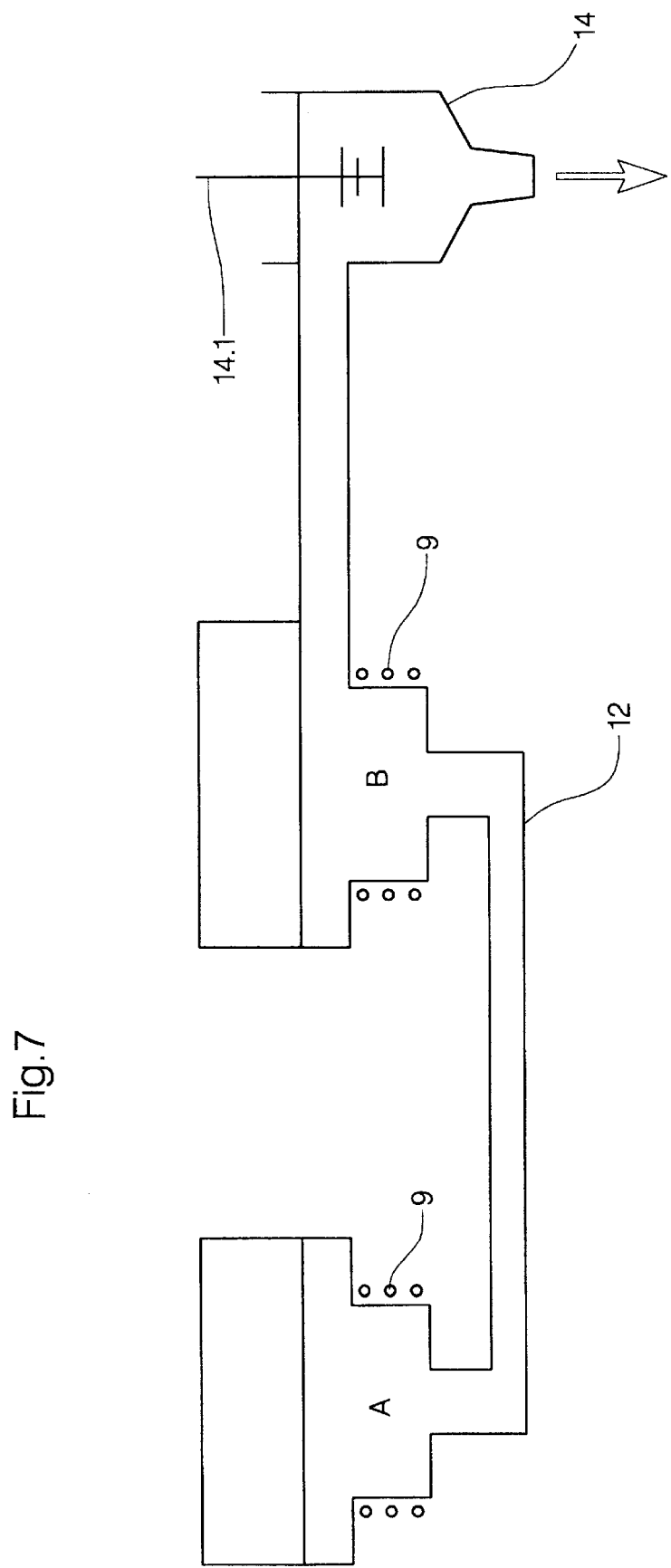
FIG. 7 shows in a schematic representation a further embodiment of an installation for melting and refining glass in which both the melting as well as the refining are performed in a mushroom-type crucible each.

In the embodiment according to FIG. 7, one recognizes a combination of two mushroom-type skull crucibles according to the invention. Both operate with high-frequency energy (see coils 9). The skull crucible A is used as a melting unit and skull crucible B is used for refining.

The crucible A is supplied with the glass batch or glass melt from above. The molten glass is discharged at the crucible bottom. The glass melt is supplied to skull crucible B from below via conduit 12. The conduit is thus connected to the bottom of skull crucible A on the one hand and to the bottom of skull crucible B on the other hand. This leads to the following advantage. It is achieved in this way that the surface layer of the glass melt in crucible B is relatively hot and the gas bubbles will thus rise up.

The dimensioning of a crucible model with approx. 8 L of hot melt volume is mentioned as a concrete embodiment. The crucible has a diameter of 20 cm in the lower zone. It is short-circuited at the bottom by a water-cooled ring. The melt level is 25 cm. The cooling fingers are outwardly bent off by 90 degrees at a height of 20 cm. The collar has an outside diameter of 50 cm. A ring of ceramic silicon dioxide or zirconium dioxide or zirconium silicate sits on the collar edge. The glass sealing is made via the contact of the ceramic ring with the water-cooled collar plate. The cover plate also consists of silicon dioxide or zirconium dioxide or zirconium silicate. The heating of the upper furnace chamber is made by means of an oxygen burner.

The above crucible could be used both as a continuously operating refining crucible as well as a discontinuous melting crucible over several months without any corrosion problems occurring.

It is understood that larger volumes can be achieved by respective upscaling. In a crucible with a melt volume of 200 L, a second electric short circuit on the outer collar edge has proven to be necessary.

Figure 8:
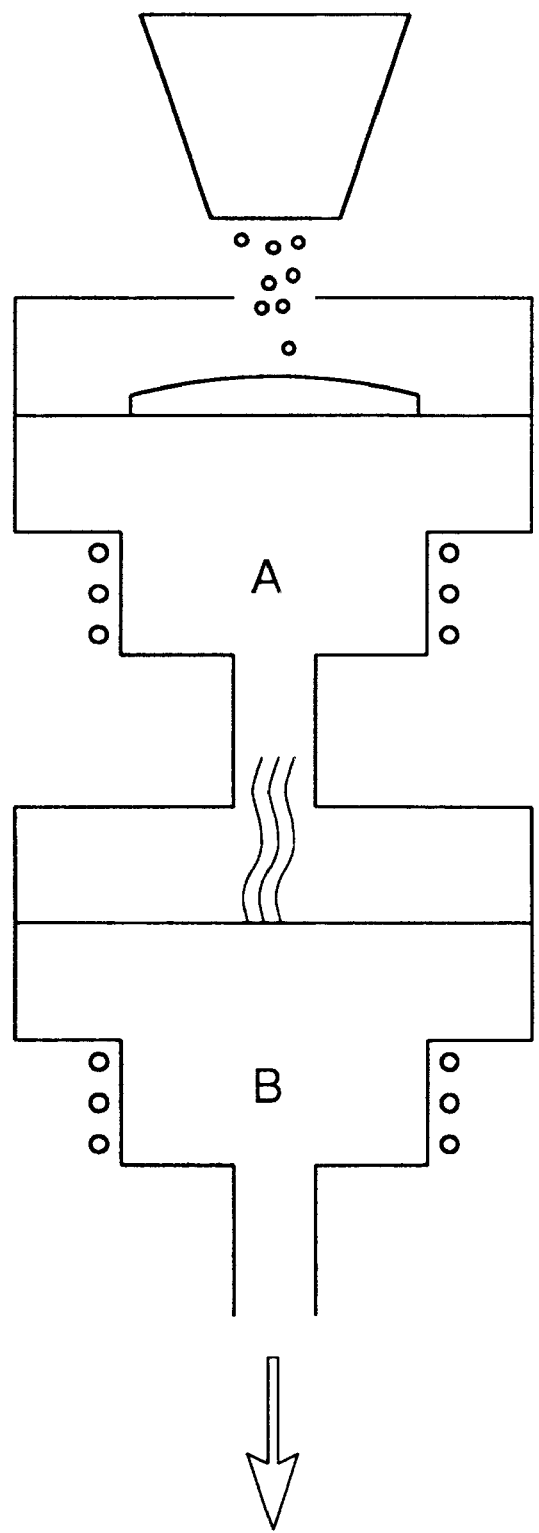
FIG. 8 shows in a schematic representation a further installation for melting and refining glass in which both the melting as well as the refining are performed in a mushroom-type crucible each.

In the embodiment according to FIG. 8, a refining crucible B is provided downstream of melting crucible A. The melt reaches crucible B from crucible A in free fall. Both cases again concern the mushroom-type crucible in accordance with the invention. The advantage of this arrangement is that the connecting paths between the high-frequency components are relatively short. This plays an important role when aggressive glasses with high requirements placed on transmission are to be produced. Resistance-heated platinum components are used as connecting elements in this case.

The dimensioning of a crucible model with approx. 8 L of hot melt volume is mentioned as a concrete embodiment. The crucible has a diameter of 20 cm in the lower zone. It is short-circuited at the bottom by a water-cooled ring. The melt level is 25 cm. The skull cooling fingers are outwardly bent off by 90 degrees at a height of 20 cm. The collar has an outside diameter of 50 cm. A ring of ceramic silicon dioxide sits on the collar edge. The glass sealing is made via the contact of the ceramic ring with the water-cooled collar plate. The cover plate also consists of silicon dioxide. The heating of the upper furnace chamber is made by means of an oxygen burner which projects laterally into the upper furnace.

The coil has a distance of 2 cm from the skull crucible and 4 cm from the collar. The heating of the glass is performed by means of high-frequency energy. The high-frequency is at 1 MHz. The high-frequency output is between 100 and 300 kW, depending on the melting temperature.

The above crucible could be used both as a continuously operating refining crucible as well as a discontinuous melting crucible over several months without any corrosion problems occurring.

Larger volumes of the mushroom-type skull require a respective upscale of the high-frequency output and an adjustment of the high frequency. A frequency of 100 kHz and high-frequency outputs of 1000 to 2000 kW (depending on the desired temperature) are required for a mushroom-type crucible with 400 liters of melt volume. A limitation of the melt volume is essentially seen only by the maximum accessible high-frequency output.

What is claimed is:
1. A skull crucible for the melting or refining of glasses;
   1.1 with a crucible wall (1);
   1.2 with a crucible bottom (3);
   1.3 with an induction coil (9) which encloses the crucible wall (1) and by which high frequency energy can be coupled into the content of the crucible;
   1.4 the crucible wall is formed by a ring of metal pipes (1.1) which can be connected to a cooling medium, with slots between mutually adjacent metal pipes (1.1);
   1.5 the metal pipes (1.1) are bent off at their upper ends in such a way that, in a top view of the crucible wall (1), they extend outwardly and form a collar (2);

1.6 the collar (2) is enclosed by a further upper wall (4) whose upper edge projects beyond the plane of the collar (2), so that the melt covers the collar (2) during operation.

2. A skull crucible as claimed in claim 1, characterized in that the upper furnace chamber (6) is covered above the melt.

3. A skull crucible as claimed in claim 1, characterized in that the upper furnace chamber (6) is associated with one or several burners (8).

4. A skull crucible as claimed in claim 1, characterized in that the metal pipes (1.1) expand after the bend-off in the zone of the collar (2) into hollow plates (2.2) which carry cooling medium directly or indirectly.

5. A skull crucible as claimed in claim 1, characterized in that the metal pipes (1.1) are enclosed by hollow plates in the zone of the collar (2).

6. A skull crucible as claimed in claim 4, characterized by the following features:

6.1 the plates (2.1) are trapezoid (as seen in a top view);

6.2 the plates (2.1) are arranged and disposed in such a way that a radially extending slot remains between two mutually adjacent plates.

7. A skull crucible as claimed in claim 5, characterized in that the slots are provided with a constant width.

8. A skull crucible as claimed in claim 1, characterized in that the upper wall (4) is made of ceramic material and that no water-cooled metallic components are disposed in the upper furnace chamber above the melt.

9. A skull crucible as claimed in claim 1, characterized in that the crucible can be filled from above and has an outlet in the bottom.

10. A skull crucible as claimed in claim 1, characterized in that the skull crucible has an inlet in the bottom and an outlet in the upper part.

11. A skull crucible as claimed in claim 1, characterized in that the outlet is a resistance-heated platinum pipe.

12. A skull crucible as claim in claim 2, characterized in that the upper furnace chamber (6) is associated with one or several burners (8).

13. A skull crucible as claimed in claim 2, characterized in that the metal pipes (1.1) expand after the bend-off in the zone of the collar (2) into hollow plates (2.2) which carry cooling medium directly or indirectly.

14. A skull crucible as claimed in claim 3, characterized in that the metal pipes (1.1) expand after the bend-off in the zone of the collar (2) into hollow plates (2.2) which carry cooling medium directly or indirectly.

15. A skull crucible according to claim 2, characterized in that the metal pipes (1.1) are enclosed by hollow plates in the zone of the collar (2).

16. A skull crucible according to claim 3, characterized in that the metal pipes (1.1) are enclosed by hollow plates in the zone of the collar (2).

17. A skull crucible as claimed in claim 5, characterized by the following features:

the plates (2.1) are trapezoid (as seen in atop view);

the plates (2.1) are arranged and disposed in such a way that a radially extending slot remains between two mutually adjacent plates.

18. A skull crucible as claimed in claim 2, characterized in that the upper wall (4) is made of ceramic material and that no water-cooled metallic components are disposed in the upper furnace chamber above the melt.

19. A skull crucible as claimed in claim 3, characterized in that the upper wall (4) is made of ceramic material and that no water-cooled metallic components are disposed in the upper furnace chamber above the melt.

20. A skull crucible as claimed in claim 4, characterized in that the upper wall (4) is made of ceramic material and that no water-cooled metallic components are disposed in the upper furnace chamber above the melt.

* * * * *